Nov. 3, 1959 K. MICHEL 2,910,913
CAMERA MICROSCOPES
Filed May 15, 1956 3 Sheets-Sheet 2
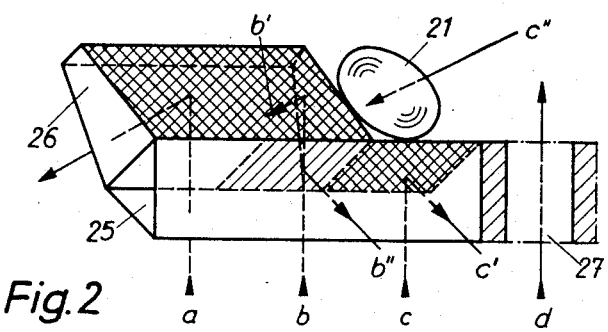
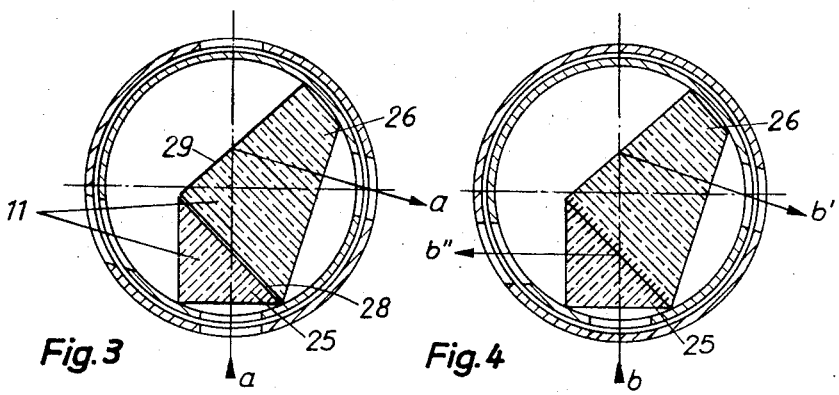
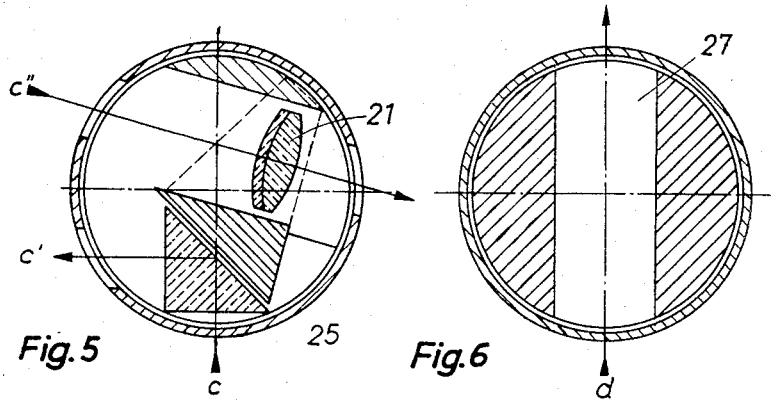
Inventor
Kurt Michel
by Singer, Stern & Carlberg
Attorneys

United States Patent Office 2,910,913
Patented Nov. 3, 1959

2,910,913

CAMERA MICROSCOPES

Kurt Michel, Aalen, Germany, assignor to Carl Zeiss, Heidenheim (Brenz), Wurttemberg, Germany Application May 15, 1956, Serial No. 585,103

Claims priority, application Germany May 17, 1955

7 Claims. (Cl. 88—39)

The invention relates to a camera-microscope provided with means for splitting the beam coming from or passing through the object so as to permit simultaneously a visual observation of the object and the taking of a photograph of the same.

It is an object of the invention to provide a camera-microscope with a reflecting element arranged in front of the eyepiece serving for normal observation of the object. This reflecting element consisting of a totally reflecting prism which reflects all of the image-forming luminous beams over a beam-splitting element on the one hand to the carrier of the photographic layer and on the other hand to a graticule arranged in a plane conjugate to that of the photographic layer. An image which is conjugate to that on the photographic layer and which is also formed in the plane of the graticule is projected together with an image of the graticule into the viewing field of the eyepiece by means of additional reflecting elements. The reflecting element arranged in front of the eyepiece is preferably arranged so as to be exchangeable or adjustable so that also direct observation of the object by means of the usual objective and eyepiece combination is possible.

By guiding the image-forming luminous beams over a reflector arranged in front of the eyepiece to elements arranged in conjugate planes, i.e. to the photographic layer on the one hand and the graticule on the other, it is not only assured that identical images are formed on the photographic layer and in the eyepiece but one has also the possibility of bringing the image of the object in coincidence with the graticule in the eyepiece. According to the invention the graticule is provided with a border-line corresponding to the size of the picture area on the photographic layer so that by shifting the object and selecting a suitable objective of the plurality of objectives provided by the conventional microscope turret the desired picture area can be photographed with the desired enlargement corresponding to the available picture area on the carrier of the photographic layer.

According to a further object of the invention the graticule may additionally contain a pattern consisting of double lines resolvable by the eyepiece, e.g. of a cross of double lines. This pattern appears together with the image of the object in the eyepiece which is focussed for sharp resolution of the double lines. When fine-focussing the objective for optimum image sharpness the optimum sharpness of the image on the photographic layer is also assured.

It is another object of the invention to produce an extremely compact construction of a camera-microscope and this object is realized by arranging the plateholder containing the carrier of the photographic layer, as well as the graticule, the beam-splitting element and the additional reflecting elements in the interior of a completely enclosed column carrying also the eyepiece and the turret with the objectives.

Still another object of the invention is the arrangement of another beam-splitter between the mentioned beam-splitting element and the graticule, which additional beam-splitter deflects a predetermined percentage of the luminous flux serving to expose the photographic layer into a photo-electric cell which latter preferably is also at least approximately arranged in a plane conjugate to the carrier of the photographic layer 16a. This photo-electric cell is connected in a conventional manner to a sensitive electrical instrument indicating the light values of the light reaching the photographic layer or which serves to actuate an automatic exposure governor. It is also arranged inside of the column of the microscope.

According to another object of the invention there is arranged in the path of the deflected beam of light which produces the final image in the eyepiece an auxiliary lens which projects the outlet image of the microscope objective at least approximately in the aperture of a special telescope objective which together with the eyepiece serves to observe the graticule and the image of the object appearing in it. This auxiliary lens is preferably placed in front of the graticule. If apart from the graticule a photo-electric cell is also provided as described above, then the auxiliary lens is arranged in front of the photo-electric cell as well as in front of the graticule, it is therefore placed between the two beam-splitting elements. This has the result that the distance between the main beam-splitter and the planes equivalent to the carrier of the photographic layer which are the loci for the graticule and for the photo-electric cell are reduced. One obtains smaller distances and thereby more compact dimensions for the column housing the optical elements.

By changing the length of the path of light between the objective and the eyepiece and most of all by inserting the auxiliary lens the elimination of the chromatic difference in magnification is disturbed which is normally achieved by the compensating eyepiece used for the observation of the object. In order to again reproduce this compensation there is provided a correcting member consisting of a further suitably dimensioned lens which is arranged between the graticule and the auxiliary lens arranged in front of the eyepiece. This also is preferably located inside the column.

It is a further object of the invention to provide a single handle for the purpose of changing the direction of the image-forming luminous beam by directing it either directly into the eyepiece or by a circuitous path over-beam-splitting elements towards an end image which is united with an image of the graticule and which combined image is observed by the eyepiece, whereby the beam-splitting element arranged in front of the eyepiece is formed by a glass body consisting of two combined prisms which is mounted in slidable carrier. This carrier is transversely slidable in the column at right angles to the vertical tube containing the objective.

One of the two prisms of this glass body is constructed to predominantly reflect in a direction at right angles to that of the entering beam of light. The prism comprises different segments each having a different effect upon the beam of light. A first segment of this prism has a reflecting surface which is rendered ineffective by means of a cement layer between said first segment and an auxiliary prism and provides that the entering luminous beam is immediately deflected into the eyepiece, while a second segment of said prism has a reflecting surface which is coated with a partly transmitting reflecting layer. A third segment of said prism is provided with a totally reflecting layer.

The other one of said two prisms is cemented to the first one and is provided with a totally reflecting mirror coating which is limited in the axial direction of the prism so that it covers only the first two mentioned segments of the first mentioned prism. In view of the total reflecting layer of the third segment of the first prism the second prism does not cover the third segment of the first prism, and therefore there is made available a space for the above-mentioned telescope objective which can easily be accommodated adjacent said third segment of the first prism. Preferably, the slidable tube containing the two prisms is provided in one extreme position with an aperture through which the image-forming luminous beam from the objective can enter to pass vertically upwards and then can be directed by means of an auxiliary optical system to a ground glass screen, a drawing surface or a projection screen.

With these and other objects in view the invention will now be described with reference to the accompanying drawing, in which—

Fig. 2 illustrates diagrammatically and in somewhat perspective view the glass body consisting of two combined prisms arranged in the path of the luminous beam passing through the microscope objective;

Fig. 3 illustrates a cross-sectional view of the axially slidable prism carrier along the line III—III of Fig. 7;

Fig. 4 illustrates a cross-sectional view along the line IV—IV of Fig. 7;

Fig. 5 illustrates a cross-sectional view along the line V—V of Fig. 7;

Fig. 6 illustrates a cross-sectional view along the line VI—VI of Fig. 7; and

Figure 1:
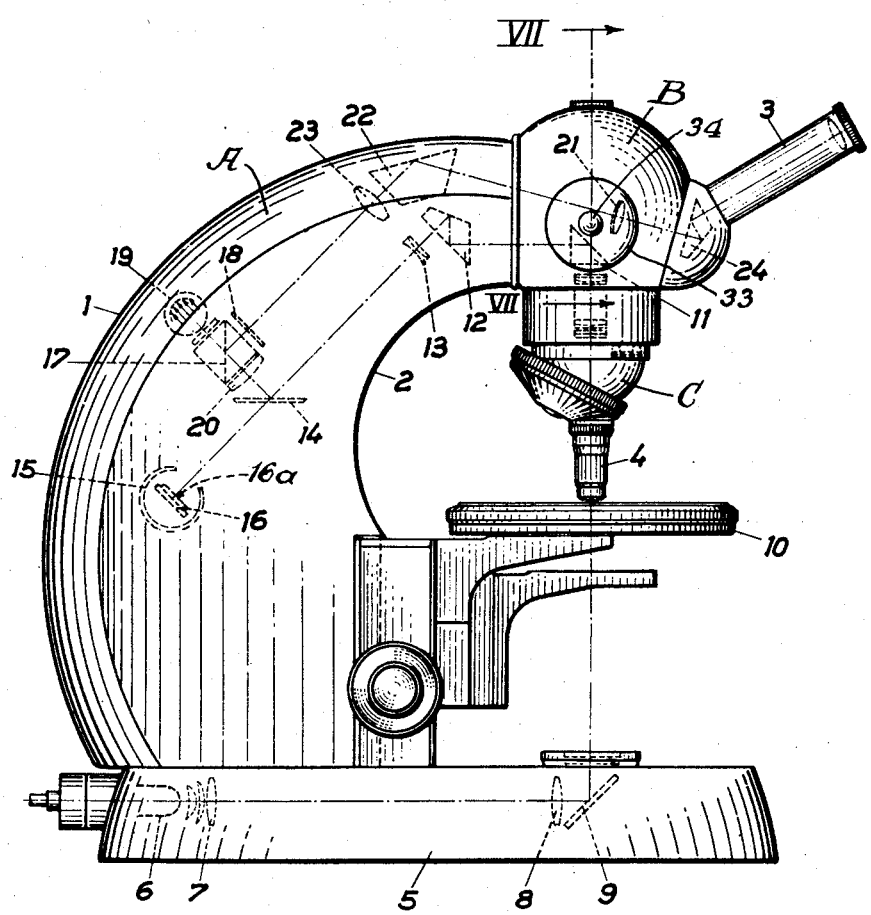
Fig. 1 illustrates in a side elevation view a camera microscope in accordance with the present invention and in which the optical elements and other details arranged in the path of the luminous beam passing through the microscope objective are diagrammatically illustrated.

The column or supporting head A of the instrument is curved so as to follow substantially two circular arcs 1 and 2 of different radii and carries at its free end B the eyepiece 3 and the objective turret C of which one objective 4 is shown in vertical operative position. The column 1 is closed all round and rests upon a base plate 5. The latter contains a light source 6, a condenser lens system 7, 8 and a mirror 9 arranged at a 45° angle for the illumination by transmitted light the object placed upon the customary vertically adjustable table 10. In axial alinement with the objective 4 and in front of the eyepiece 3 is arranged a deflecting prismatic body 11 with a totally reflecting hypotenuse surface, which directs the entire image-forming luminous beam through a doubly-reflecting prism 12 and a projection lens system 13 onto a semi-transparent beam-splitting plate 14. The light passing through the plate 14 forms a final microscopical image on the photographic layer 16a on the carrier 16 in the plateholder 15 arranged in the interior of the column A. The light deflected by the beam-splitter 14 passes through a further beam-splitter 17 and illuminates on the one hand a graticule 18 arranged in a plane equivalent to the photographic layer 16a on the carrier 16 and on the other hand energizes a photoelectric cell 19 arranged at least approximately in a plane also conjugate to the photographic layer. In front of the beam-splitter 17 is placed an auxiliary lens 20 which reduces the distance from the beam-splitter 14 of the conjugate planes serving as loci for the graticule and the photo-electric cell and which forms an image of the exit pupil of the objective 4 approximately in the aperture of a telescopic lens system 21 which together with the eyepiece 3 serves for the observation of the graticule 18 and of the image of the object appearing in it. For the deflection of the beam of light passing through the graticule towards the telescopic lens system 21 serves a prism 22 whose basis is totally reflecting. A correction lens 23 is placed before the prism 22 and serves for the reproducing the compensating effect of the chromatic difference of magnification of the objective 4 of the eyepiece disturbed by the alteration of the path of light as particularly caused by the projection lens system 13. A double reflecting prism 24 serves for deflecting the beam of light passing through the telescopic lens system 21 into the eyepiece 3.

According to Fig. 2 (see also Figs. 3, 4, 5 and 6), the glass body forming the slidable deflecting prism 11 consists of a preferably rectangular prism 25 and of a second prism 26 cemented to the hypotenuse face of prism 25. The prism 26 extends for about two-thirds of the length of prism 25. A segment of the prism body 11 extending for about one-third of the surface of the prism 25 is rendered ineffective for reflection by the cement layer between prisms 25 and 26. A beam of light $a$ (Figs. 2 and 3) coming from the objective 4 passes straight through the cement layer and is reflected in the direction towards the eyepiece by the totally reflecting mirror surface 29 of the prism 26.

Another segment of the prism body 11 covering approximately the second third of the reflecting surface of the prism 25 has a surface coated with a partially transmitting layer so that after slidably adjusting the glass body $a$ light beam $b$ (Figs. 2 and 4) coming from the objective 4 is split into a part-beam $b'$ which is deflected into the eyepiece while a further part-beam $b''$ is deflected for instance into a photo-electric cell for the purpose of determining the light value and the optimum exposure.

Still another segment of the prism body 11 occupying approximately the last third of the reflecting surface of the prism 25 is totally reflecting so that after a further axial slidable adjustment of the glass body 11 towards the right (Fig. 7) the entire light beam $c$ (Figs. 2 and 5) coming from the objective 4 is reflected in the direction $c'$. The reflected beam of light $(c')$—split by the beam-splitter 14 (Fig. 1)—may be united in two planes equivalent with respect to the object being viewed to form one final microscopical image on photographic layer 16a on the carrier 16 (Fig. 1) on the one hand and on the graticule 18 (Fig. 1) carrying a border-line corresponding to the useful area on the photographic layer on the other hand and may be directed towards the eyepiece over this circuitous path through the telescopic lens system 21 as the light beam $c''$.

The prism body 11 is mounted in the tubular end of a cylindrical slidable member 30, the other end of which forms another segment immediately following the prism 25 and is provided with a transverse cylindrical bore 27 through which after a further axial adjustment of the slidable member 30 the entire beam of light coming from the microscope objective 4 passed in a vertical upward direction and is subsequently united by an auxiliary optical system to form a projected image.

Fig. 3 shows a cross section through the first segment of the glass body 11 with the prism 25 and with the prism 26 cemented to it. The cement layer 28 between the two prisms 25 and 26 nullifies the reflecting action of the hypotenuse surface of the prism 25 and the entire beam of light $a$ is reflected in the direction towards the eyepiece 3 by the totally reflecting mirror surface 29 of the prism 26.

The second segment illustrated in Fig. 4 shows that the hypotenuse surface of the prism 25 is coated with a partially transmitting mirror, the beam of light $b$ is consequently split into a part-beam $b'$ deflected towards the eyepiece 3 and a beam $b''$ reflected at right angles by the partially transmitting surface of prism 25.

The third segment illustrated in Fig. 5 shows that only the prism 25 is arranged in the path of the beam of light. Its hypotenuse surface is totally reflecting and consequently the entire beam of light $c$ is reflected at right angles as the beam $c'$. A part-beam $c''$ of $c'$ returns deflected in the direction towards the eyepiece 3 and arrives at the eyepiece through the telescopic lens system 21.

Fig. 6 finally shows a cross-sectional view the last segment of the slidable member 30 enclosing at one end the glass body 11 while the other end is provided with a transverse cylindrical bore 27.

Figure 7:
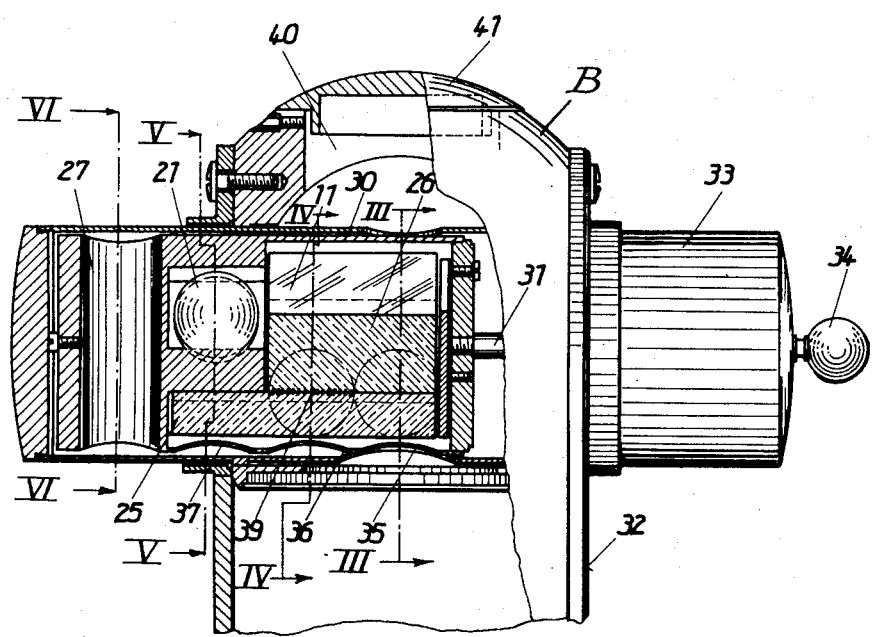
Fig. 7 illustrates a partial broken sectional view of the camera microscope along the line VII—VII of Fig. 1.

Fig. 7 illustrates the slidable member 30 arranged in the column or body of the microscope in front of the eyepiece 3 the tubular slide member carrying the prisms 25, 26, the telescopic lens system 21 and the bore 27. The slidable cylindrical member 30 is axially adjustable by operation of a handle 34 and a rod 31 within a cylindrical casing 33 which traverses the microscope column portion B at right angles. The tubular casing 33 like the slidable member 30 is provided with apertures for the passage of the beam of light coming from the microscope objective and for the reflected beam.

The slidable member 30 is provided with apertures 35, 36, and 37 for the passage of the beam of light coming from the microscope objective and can click into place segment by segment so that the positions for the different uses are quickly adjusted one after the other. In the position of Fig. 7 the reflecting effect of the prism 25 is nullified by the cement layer between the two prisms 25, 26. By pulling the handle 34 toward the right the next segment comes into its operative position in which a partially transmitting reflecting layer 39 is arranged between the two prisms 25 and 26 (see also Fig. 4). In this position the beam of light coming from the objective 4 is split into two beams $b'$ and $b''$.

When pulling the handle 34 again toward the right the third segment of the slidable member 30 comes into operative position and the entire beam of light coming from the objective is deflected towards the observer by the totally reflecting surface of the prism 25. After splitting of the deflected beam a part-beam returns in the direction towards the plane of the drawing and reaches the eyepiece over the telescopic lens system 21.

When pulling the handle 34 fully to the right the last segment of the slidable member 30 reaches its operative position. In this position the path for the light beam coming from the objective passes freely through the transverse bore 27 and into the upper space 40 in the body. The space 40 is closed by a removable cap 41.

What I claim is:

1. A camera microscope comprising a base, a hollow column extending upwardly from said base and having its upper end curved to extend laterally from its lower end, a microscope objective supported by the upper end of said hollow column in a manner to extend downwardly therefrom, a table extending laterally from said column and adapted to support an object to be viewed and photographed in a position directly below said objective, means for illuminating said object from below, an eye piece mounted on said upper end of said column, a reflecting element arranged within the hollow upper end of said column and above said microscope objective, means for selectively adjusting said reflecting member to at least two different operative positions in one of which the beam of light passing upwardly through said microscope objective is directly deflected into said eye piece, while in another operative position of said reflecting member the beam of light passing through said microscope objective is reflected into said hollow column, means for supporting within said hollow column a photographic layer in the path of said reflected beam of light, a beam splitting element arranged in said path of said reflected beam of light and in spaced relation in front of said photographic layer to deflect a portion of said reflected beam of light away from said photographic layer and towards said eye piece, a projection lens system in the path of said reflected light beam between said reflecting member and said beam splitting element, a graticule arranged in the path of said portion of said reflected beam of light, and additional reflecting means within said hollow column for reflecting the final image of the object produced by said portion of said reflected beam of light in the plane of said graticule together with an image of said graticule into the viewing field of said eye piece, said graticule being arranged in a plane equivalent to the plane in which said photographic layer is arranged so that identical images are formed on said photographic layer and on said graticule.

2. A camera microscope comprising a base, a hollow column extending upwardly from said base and having its upper end curved to extend laterally from its lower end, a microscope objective extending downwardly from said upper end of said column, a table extending laterally from the lower end of said column for supporting an object to be viewed and photographed in a position directly below said objective, means within said base for illuminating the object placed on said table from below, an eye piece mounted on said upper end of said column above said objective, a reflecting element arranged within the hollow upper end of said column and above said microscope objective, means for selectively adjusting said reflecting member to at least two different operative positions in one of which the beam of light passing upwardly through said microscope objective is directly deflected into said eye piece, while in another operative position of said reflecting member the beam of light passing through said microscope objective is totally reflected into said hollow column, means for supporting within said hollow column a photographic layer in the path of said totally reflected beam of light, a beam splitting element arranged in said path of said totally reflected beam of light and in spaced relation in front of said photographic layer to deflect a portion of said totally reflected beam of light away from said photographic layer and towards said eye piece, a projection lens system in the path of said reflected light beam between said reflecting member and said beam splitting element, a graticule arranged in the path of said portion of said reflected beam of light, and additional reflecting means within said hollow column for reflecting the final image of the object produced by said portion of said reflected beam of light in the plane of said graticule together with an image of said graticule into the viewing field of said eye piece, said graticule and said photographic layer being arranged in equivalent planes with respect to the object being viewed so that identical images are formed on said photographic layer and in the viewing field of said eye piece, the optical axes of said microscope objective, said eye piece, said beam splitting element and the operative portion of said reflecting member being all arranged in a common vertical plane.

3. A camera microscope comprising a base, a hollow column extending upwardly from said base and having its upper end curved to extend laterally from its lower end, a microscope objective supported by the upper end of the hollow column in a manner to extend downwardly therefrom, a table extending laterally from said column and adapted to support an object to be viewed and photographed in a position directly below said objective, means for illuminating the object placed on said table from below, an eye piece mounted on said upper end of said hollow column in a position above the upper end of said objective, a reflecting element arranged within the upper end of said column above the upper end of said microscope objective and between the latter and said eye piece, means for selectively adjusting said reflecting member to at least two different operative positions, said reflecting element being composed of a main prism and an auxiliary prism attached to the reflecting surface of said main prism thereby creating at least two different positions of said adjustable glass body with reference to the microscope objective, in one position of which the reflecting effect of the main prism is nullified by a cement layer between said two prisms so that the light beam is deflected directly into said eye piece, while in another position the reflecting surface of said prism is devoid of such cement layer and is totally reflecting to reflect the beam of light passing through said objective laterally into said hollow column, a photographic layer within said hollow column and arranged in the path of said last mentioned totally reflected beam of light, a beam splitting element arranged in the path of said totally reflected beam of light in spaced relation in front of said photographic layer to deflect a portion of said totally reflected beam of light away from said photographic layer towards said eye piece, a projection lens system in the path of said reflected light beam between said reflecting member and said beam splitting element, a graticule being arranged in the path of said portion of said reflected beam of light, and additional reflecting means within said hollow column for reflecting the final image of the object produced by said portion of said reflected beam of light in the plane of said graticule together with an image of said graticule into the viewing field of said eye piece, said graticule and said photographic layer being arranged in equivalent planes with respect to the object being viewed so that identical images are formed on said photographic layer and in the viewing field of said eye piece.

4. A camera microscope comprising a base, a hollow column extending upwardly from said base and having its upper end curved to extend laterally from its lower end, a microscope objective supported by the upper end of the hollow column in a manner to extend downwardly therefrom, a table extending laterally from said column and adapted to support an object to be viewed and photographed in a position directly below said objective, means for illuminating the object placed on said table from below, an eye piece mounted on said upper end of said hollow column in a position above the upper end of said objective, a reflecting element arranged within the upper end of said column above the upper end of said microscope objective and between the latter and said eye piece, said reflecting element comprising a longitudinal glass body arranged with its longitudinal axis at right angles to the axis of said microscope objective, means for slidably adjusting said glass body along its longitudinal axis within said column so as to selectively bring different portions of said glass body into the range of the beam of light passing through said objective, said longitudinal glass body being composed of a main prism and an auxiliary prism attached to the reflecting surface of said main prism thereby creating at least two different positions of said adjustable glass body with reference to the microscope objective, in one position of which the reflecting effect of the main prism is nullified by a cement layer between said two prisms so that the light beam is deflected directly into said eye piece, while in another position the reflecting surface of said main prism is devoid of such cement layer and is totally reflecting to reflect the beam of light passing through said objective laterally into said hollow column, a photographic layer within said hollow column and arranged in the path of said last mentioned totally reflected beam of light, a beam splitting element arranged in the path of said totally reflected beam of light in spaced relation in front of said photographic layer to deflect a portion of said totally reflected beam of light away from said photographic layer towards said eye piece, a projection lens system in the path of said reflected light beam between said reflecting member and said beam splitting element, a graticule arranged in the path of said portion of said reflected beam of light, and additional reflecting means within said hollow column for reflecting the final image of the object produced by said portion of said reflected beam of light in the plane of said graticule together with an image of said graticule into the viewing field of said eye piece, said graticule and said photographic layer being arranged in equivalent planes with respect to the object being viewed so that identical images are formed on said photographic layer and in the viewing field of said eye piece.

5. A camera microscope as claimed in claim 4, in which said slidably mounted longitudinal glass body is provided with a zone in which the reflecting surface of said main prism is coated with a semi-reflecting layer thereby making this mentioned zone partially light transmitting.

6. A camera microscope as claimed in claim 4, in which said means for slidably mounting said glass body comprises a slidably mounted member enclosing said two prisms, a casing containing said slidable member and attached to said column, said slidably mounted member carrying also a telescopic lens system adapted to project an image of the object into the eye piece of said microscope when said glass body is adjusted to a third position in which said totally reflecting face of said main prism is struck by the beam of light passing through said microscope objective.

7. A camera microscope as claimed in claim 4, in which said means for slidably mounting said glass body comprises a slidably mounted member enclosing said two prisms, a casing containing said slidable member and attached to said column, said slidably mounted member carrying also a telescopic lens system adapted to project an image of the object into the eye piece of said microscope when said glass body is adjusted to a third position in which said totally reflecting face of said main prism is struck by the beam of light passing through said microscope objective, said slidably mounted member being also provided adjacent one end of said glass body with a passage, said passage in a fourth position of said glass body being arranged in axial alignment with said microscope objective so that the beam of light passes freely through said passage.

References Cited in the file of this patent

UNITED STATES PATENTS

| | | |
|---|---|---|
| 1,958,280 | Patterson et al. | May 8, 1934 |
| 1,980,217 | Moreno | Nov. 13, 1934 |
| 2,209,532 | Michel | July 30, 1940 |
| 2,303,906 | Benford et al. | Dec. 1, 1942 |
| 2,433,674 | O'Brien | Dec. 30, 1947 |
| 2,607,266 | Rabinowitz | Aug. 19, 1952 |

FOREIGN PATENTS

| | | |
|---|---|---|
| 581,535 | Germany | July 29, 1933 |
| 120,899 | Sweden | Feb. 17, 1948 |
| 167,070 | Austria | Nov. 10, 1950 |